(12) United States Patent
Boelle

(10) Patent No.: US 11,321,706 B2
(45) Date of Patent: May 3, 2022

(54) METHOD FOR INSTANT ISSUANCE CARD PRODUCTION

(71) Applicant: GIESECKE+DEVRIENT MOBILE SECURITY GMBH, Munich (DE)

(72) Inventor: Christian Boelle, Pune (IN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 91 days.

(21) Appl. No.: 16/496,659

(22) PCT Filed: Mar. 21, 2018

(86) PCT No.: PCT/EP2018/000104
§ 371 (c)(1),
(2) Date: Sep. 23, 2019

(87) PCT Pub. No.: WO2018/171936
PCT Pub. Date: Sep. 27, 2018

(65) Prior Publication Data
US 2021/0073791 A1    Mar. 11, 2021

(30) Foreign Application Priority Data

Mar. 22, 2017   (DE) .................... 10 2017 002 794.3

(51) Int. Cl.
G06Q 20/00    (2012.01)
G06Q 20/34    (2012.01)
G06Q 20/40    (2012.01)

(52) U.S. Cl.
CPC ....... *G06Q 20/355* (2013.01); *G06Q 20/4018* (2013.01)

(58) Field of Classification Search
CPC .................................................... G06Q 20/355
(Continued)

(56) References Cited

U.S. PATENT DOCUMENTS 6,877,656 B1    4/2005  Jaros et al.
7,806,338 B1   10/2010  Behner et al.
(Continued)

FOREIGN PATENT DOCUMENTS

JP    2011088291 A     5/2011
JP    2015203910 A    11/2015
(Continued)

OTHER PUBLICATIONS

Implementation of smart card personalization software by Hafid Mammass (Year: 2011).*
(Continued)

*Primary Examiner* — Bruce I Ebersman
*Assistant Examiner* — John A Anderson
(74) *Attorney, Agent, or Firm* — Workman Nydegger

(57) ABSTRACT

The invention provides a method that allows an issuer system, e.g. of a bank, to have generated a plurality of anonymous accounts and cards for working up a stock and to only personalize them individually if required. In the personalization step at the card issuer, e.g. in the bank branch, a printing of the back side does not have to be performed, instead all the necessary printing of the back side is already effected at the card manufacturer during the manufacturing of the anonymous card. As a result, a simple, low-cost printer without a back-side printing option can be utilized for the personalization of the anonymous card.

6 Claims, 1 Drawing Sheet

(58) Field of Classification Search
USPC .......................................................... 705/39
See application file for complete search history.

(56) References Cited

U.S. PATENT DOCUMENTS

| | | | |
|---|---|---|---|
| 8,225,386 B1* | 7/2012 | de Jong | G06Q 20/3552 726/9 |
| 2005/0199706 A1 | 9/2005 | Beck et al. | |
| 2008/0000965 A1* | 1/2008 | Zellner | G06F 16/951 235/380 |
| 2010/0044433 A1 | 2/2010 | Wankmueller et al. | |
| 2012/0023009 A1 | 1/2012 | Pazlar et al. | |
| 2013/0003104 A1* | 1/2013 | DeFore | G06F 3/1271 358/1.14 |
| 2015/0371219 A1 | 12/2015 | Ljujic | |
| 2016/0030981 A1 | 2/2016 | Astratov | |

FOREIGN PATENT DOCUMENTS

| | | |
|---|---|---|
| WO | 2013006181 A1 | 1/2013 |
| WO | 2016210286 A1 | 12/2016 |

OTHER PUBLICATIONS

Rankl et al., "Handbook of Chip Cards," 5th Edition. Carl Hanser Publishing Munchen, 2008, ISBN 978-3-446-40402-1, p. 659, Figure 14.64.
German Examination Report from DE Application No. 102017002794.3.
International Search Report and Written Opinion from PCT Application No. PCT/EP2018/000104, dated Jul. 18, 2018.
European Office Action from corresponding EP Application No. EP18719433.7, dated Apr. 7, 2021.

* cited by examiner

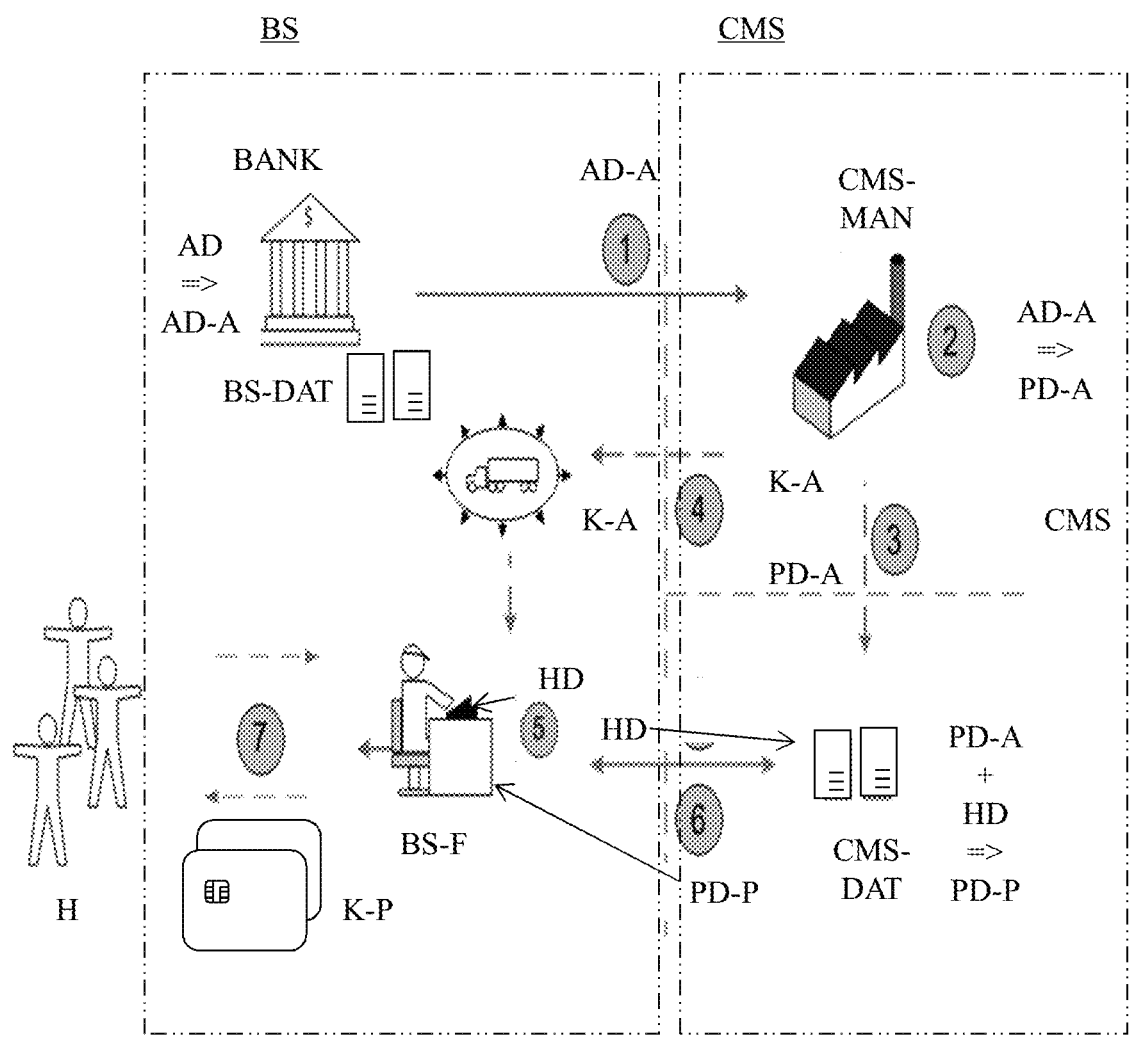

METHOD FOR INSTANT ISSUANCE CARD PRODUCTION

FIELD OF INVENTION

The invention relates to a method for the instant issuance manufacturing of a card, especially a payment card.

BACKGROUND ART

Payment cards are offered as chip cards, and for simpler cards as magnetic strip cards or embossed cards. The manufacturing of a payment card comprises at least printing the card with, for example, logos of the issuing bank or the name and/or account number of the card holder. Payment cards are more and more offered as chip cards.

Chip cards comprise a card body and a chip embedded in the card body. Upon the manufacturing of chip cards, the card body is equipped with data. The data comprise chip data and card body data.

The chip data are implemented in the chip upon the manufacturing of the chip card. The chip data normally comprise an operating system, applications and memory data. The chip data comprise general chip data which are universally identical for many or all the chip cards manufactured and chip personalization data which are specific and individual to a particular card holder. The chip personalization data comprise e.g. name and account number of the card holder.

The card body is equipped with card body data upon the manufacturing of the chip card. The card body data normally comprise: printing data for printing on the card body, where applicable on the front side and back side of the chip card, where applicable embossing data for stamping an embossing into the card body, magnetic strip data for storing in a magnetic strip applied on the card body. The print data comprise for example the name or/and logos of the issuing bank, the name and account number of the card holder, the validity period of the chip card and, in the case of payment cards, the card verification value CVV (Current status 2017: three digits).

In the case of chip cards printed on both sides, the print data of the card body data comprise front print data for printing on the front side of the chip card and back side print data for printing on the back side of the chip card. The front print data normally comprise name, card number and validity period, the back side print data at least the card verification value CVV.

In traditional manufacturing, chip cards are manufactured entirely in one card manufacturing facility and delivered in a finished state to a card customer, for example a bank institution. The card customer, e.g. the bank institution, in turn issues the chip card to an end customer, e.g. a holder of a bank account at the bank institution. The manufacturing of a chip card comprises non-individual manufacturing steps which are identical for many or all of the chip cards manufactured. As shown in [1] Rankl/Effing, *Handbuch der Chipkarten,* 5th edition, 2008, page 659, image 14.64, the manufacturing of a chip card further comprises personalization steps in which the chip and the card body are personalized (individualized). The personalization is effected with chip personalization data and card body personalization data.

In instant issuance card manufacturing, partially finished cards are delivered to a card customer, for example a bank institution, by a card manufacturer. At the location of the card customer, for example in a bank branch, the partially finished cards are completed in interaction with the card manufacturer and issued to the end customer.

Document [2] U.S. Pat. No. 6,877,656 B1 discloses a system and method for instant issuance manufacturing of a credit card where the credit card is applied for, embossed and issued at a remote location.

Document [3] WO 2013/006181 A1 discloses a printer for an instant issuance system which allows a personalization document, e.g. a card (see e.g. claim 19), to be printed and issued in the presence of the holder of the personalization document, and a corresponding printing method and printing system (e.g. claims 1, 10, 16). The printer has a connection to a server computer of the instant issuance system. The server computer performs instant issuance tasks, e.g. authenticating the user of the printer, controlling the storage and compilation of data to be applied to the personalization document, print preview display of image data and account data to be printed for the personalization document, and the like (see e.g. claim 3).

Document [4] US 2010/0044433 A1 discloses an instant issuance method for issuing a payment card, in which an already pre-personalized payment card is personalized with additional personalization data in a remote issuing station.

Document [5] US 2016/0380981 A1 discloses a system and a method for the remote monitoring of an instant issuance system with authentication between entities of the system.

Document [6] US 2015/0371219 A1 discloses a method for manufacturing a payment card, in which the payment card is printed with an image previously processed at a user end device, e.g. a smartphone.

Document [7] US 2012/0023009 A1 discloses, for the instant issuance creation of payment cards, a control method with which an unwanted duplicate creation of payment cards is to be prevented.

Document [8] U.S. Pat. No. 7,806,338 B1 discloses a method for the personalization of a payment card for an account holder while the account holder is present. In the method, at least one of the information items of name of the account holder and background information is sent from a financial institution network to a server. The server sends back personalization information to the financial institution network, which can be used to print the payment card with a printer.

An instant issuance system comprises a manufacturer system, an issuer system and a communication network between manufacturer system and issuer system.

The detailed sequence of the typical instant issuance manufacturing of a card comprises the following steps, performed at the issuer's location by an issuer system:

1) Receiving holder data which comprise at least a name of the holder;

this happens e.g. by the holder applying for a card and the holder himself or a bank employee entering the name of the holder into a bank PC.

2) supplying account data for an account of the holder, the account data comprising at least an account number and, if applicable, a card verification value CVV;

the account data already exists at the issuer (e.g. bank) or are newly assigned, e.g. in the case of the opening of a new account, by the issuer (e.g. bank).

3) creating an account data record which comprises at least the holder data and the account data;

4) transferring the created account data record to the manufacturer system;

5) receiving, from the manufacturer system, a personalization data record which is generated on the basis of the account data record, the personalization data record comprising print data for printing on the card;

6) Personalization of the card with the personalization data record.

One-sided instant issuance printers for printing cards allow a printing on the front side of the card, but not the printing on the back side. For simple embossed credit cards such a single-sided printer may be sufficient. If the back side of a card must also be printed during instant issuance printing, for example with a card verification value CVV, conventionally, a more elaborate, more expensive double-sided printer is required, which can print both the front side and the back side of a card.

SUMMARY OF THE INVENTION

The invention is based on the object of creating an instant issuance method for manufacturing a card, especially a chip card, which is applicable also with single-sided printers.

The object is solved by a method for the personalization of a card in order to manufacture a personalized card, according to claim 1, and by a method for creating a personalized personalization data record for the personalization of a card in order to manufacture a personalized card, according to claim 3. Advantageous embodiments of the invention are stated in the dependent claims.

The mutually complementary methods according to claim 1 and claim 3 allow an issuer system, e.g. of a bank, to have generated a plurality of anonymous accounts and cards for working up a stock and to only personalize them individually if required. In the personalization step at the card issuer, e.g. in the bank branch, a printing of the back side does not have to be performed, instead all the necessary printing of the back side is already effected at the card manufacturer during the manufacturing of the anonymous card. As a result, a simple, low-cost printer without a back-side printing option can be utilized for the personalization of the anonymous card.

Therefore, according to claims 1 and 3, an instant issuance method is created that is applicable also with single-sided printers.

In preferred embodiments of the invention, a payment card is provided as a card. Here, the account data comprise, among other things, account data such as the account number and a card verification value. Furthermore, the back side print data comprise CVV print data to print the card verification value CVV on the back side of the card. Upon manufacturing the anonymous card, already the anonymous card is printed with the card verification value CVV on the back side. As a result, upon the later personalization of the anonymous card in a bank branch, at an instant issuance card issuing station, only the front side of the card has to be printed.

Preferably, a plurality of anonymous account data records and a plurality of anonymous cards for a plurality of accounts are created or received. Later, a single card is taken from the majority of anonymous cards and personalized with individual holder data.

Preferably, one or several anonymous card/s or the plurality of anonymous cards in stock are created irrespective of a holder applying for a card. The receiving of holder data and the personalizing of the personalized card or the creating of the personalized personalization data record is effected only in response to a request of a holder as soon as a holder applies for a card at the issuer system.

According to embodiments, as a card issuer a bank is provided. The supplying of the account data for the anonymous cards is effected by a bank system of the bank, e.g. on a data processing server of the bank. The later receiving of holder data for personalizing an individual card is effected in a bank branch of the bank.

The method selectively further comprises supplying a card blank which comprises at least one card body and, optionally, further a chip, and on the basis of which the anonymous card is created.

BRIEF DESCRIPTION OF THE DRAWINGS

Hereinafter the invention will be explained more closely on the basis of embodiment examples and with reference to the drawings, in which are shown:

FIG. 1 An instant issuance system according to embodiments and for illustrating the invention.

DETAILED DESCRIPTION OF EMBODIMENT EXAMPLES

FIG. 1 shows an instant issuance system for illustrating the invention. The system comprises an issuer system, here a bank system of a bank, BS, and a card manufacturer system, CMS, as well as a communication network between the manufacturer system CMS and the issuer system CS. The communication network is, for example, a connection over the Internet or another network, and over which data can be exchanged in electronic form.

The instant issuance manufacturing of personalized cards K-P is effected based on the division of work between the issuer system BS of the bank and the card manufacturer system CMS. Roughly speaking, the issuer system BS processes steps involving the holder H of the card, and the card manufacturer system CMS processes steps requiring detailed information about the mode of functioning and manufacturing of the card. Fundamentally, a bank can first have generated a plurality of anonymous cards K-A and have sent them to its location. Each time a bank customer applies for a new account and for a card for the new account in the instant issuance system at the bank branch BS-F, one of the plurality of anonymous cards K-A is taken and personalized in situ into a personalized card K-P for the bank customer.

The issuer system BS at the bank comprises a data preparation server BS-DAT and a bank branch BS-F. The bank branch comprises at least one PC for receiving holder data HD and a personalization station for the personalization of anonymous cards K-A to generate personalized cards K-P therefrom. The personalization station comprises in particular a printer on which the anonymous card K-A can be printed with the name of the future holder H of the card and, where applicable, other prints so that a personalized card K-P can be generated.

At the data preparation server BS-DAT, account data records for accounts at the bank are created. The accounts will be assigned to bank customers in the future. For the accounts bank customers will get personalized cards K-P. According to the invention, the bank first creates a plurality of anonymous account data records AD-A which already comprise account number, card verification value CVV, and, where applicable, further usual account data AD, which, however, are not yet assigned to a specific bank customer/holder H and therefore do not yet comprise a real name of a real holder H of an account. Instead, a name field provided for the name of a holder H is left empty in the account data record AD-A or is preset with a placeholder which is later replaced by a real name of a holder H. As such, the account data record AD-A first is anonymous.

The plurality of anonymous account data records AD-A created is transmitted from the issuer system BS of the bank via the communication network to the card manufacturer system CMS (step 1).

The card manufacturer system CMS generates, starting out from the plurality of anonymous account data records AD-A, a corresponding plurality of anonymous personalization data records PD-A. The personalization data records PD-A contain substantially the same account data AD as the anonymous account data records AD-A, but prepared into a form so that a card can be created therefrom on card production facilities of the card manufacturer. With the plurality of anonymous personalization data records PD-A, the card manufacturer system CMS creates a corresponding plurality of anonymous cards K-A (step 2). According to the invention, the anonymous card K-A is already provided with all prints that must be printed on the back side of the card, so that later, upon personalizing the card with holder data HD of a specific holder H, no more printing of the back side is effected.

The card manufacturer system CMS supplies the anonymous personalization data records PD-A for further processing at a later point in time, in each case together with an identifier (e.g. serial number) of the respective anonymous card K-A, which was created with this special personalization data record PD-A (step 3).

The card manufacturer system CMS further sends the plurality of anonymous cards K-A to the issuer system BS of the bank, as indicated in FIG. 1 by a truck for the transport of goods, more precisely to one or several bank branches BS-F (step 4). The issuer system BS is also notified in any way of the identifier (serial number) of the respective card K-A. For example, the issuer system BS reads the identifiers (serial numbers) off/out from the cards K-A.

The anonymous cards K-A are stored in one or several bank branches BS-F of the bank until they are needed. The anonymous cards K-A are needed as soon as a customer opens an account and applies for a card in the instant issuance method.

If a bank customer applies for a card in a bank branch BS-F, the issuer system BS in the bank branch BS-F receives holder data HD from the holder, at least the name of the bank customer and future holder H of the card (step 5). For example, a bank employee types the holder data stated by the bank customer in the PC in the bank branch BS-F, or the bank customer himself types the holder data in the PC in the bank branch BS-F (kiosk system).

The issuer system BS itself cannot generate any personalization data records, but places an order with the card manufacturer to generate personalization data records. The issuer system BS therefore transmits the holder data HD via the communication network to the card manufacturer system CMS, together with the identifier (e.g. serial number) of the anonymous card K-A specifically concerned (step 6).

A data processing server CMS-DAT at the card manufacturer system CMS uses the identifier (serial number) to search for the anonymous personalization data record PD-A with which the specific anonymous card K-A was generated and supplements the anonymous personalization data record PD-A with the holder data to form personalized personalization data record PD-P (still step 6).

The card manufacturer system CMS transmits the personalized personalization data record PD-P via the communication network to the issuer system BS, or more precisely to the bank branch BS-F that ordered the personalized personalization data record PD-P from the card manufacturer system CMS.

With the personalized personalization data record PD-P the personalization station of the issuer system BS in the bank branch BS-F personalizes the anonymous card and thus generates a personalized card K-P. In particular, the personalization station prints the front side of the anonymous K-A card with the name and, where applicable, further holder data and/or prints. The back side of the card is not printed here, instead all the printings on the back side have already been performed upon the manufacturing of the anonymous card K-A.

The invention claimed is:

1. A method for the personalization of a card in order to manufacture a personalized card, in an instant issuance system for a holder of the card, the method comprising steps performed at an issuer system of a card issuer, including:
   1.1) supplying account data for an account at the issuer system, wherein the account data comprise at least an account number and the account is not yet assigned to a holder of an account;
   1.2) creating an anonymous account data record comprising at least the account data, wherein the anonymous account data record either (i) comprises no name of a holder, or (ii) contains an anonymous or fictitious name instead of a name of a holder;
   1.3) transferring the created anonymous account data record to a manufacturer system of a card manufacturer;
   4) receiving an anonymous card which is created on the basis of an anonymous personalization data record generated using the anonymous account data record, wherein the anonymous personalization data record comprises at least back side print data for printing the back side of the card, and wherein at least the back side of the card being printed according to the back side print data;
   5) receiving, from a holder, holder data which comprise at least a name of the holder;
   6.1) transferring the received holder data to the manufacturer system;
   6.2) receiving, from the manufacturer system, a personalized personalization data record which is generated on the basis of the anonymous personalization data record and the holder data, wherein the personalized personalization data record comprises, in addition to the anonymous personalization data record, at least name print data for printing the card with the name of the holder and comprises no further back side print data for printing the back side of the card than those which are already contained in the anonymous personalization data record;
   7) personalizing the anonymous card with the holder data from the personalized personalization data record, in particular printing the card with the name of the holder in order to manufacture a personalized card;
   wherein a communication network is provided between the manufacturer system and the issuer system;
   as a card there is provided a payment card;
   the account data comprise a card verification value CVV;
   the back side print data comprise CVV print data to print the back side of the card with the card verification value CVV; and
   the anonymous card received according to step 5) being printed with the card verification value CVV on the back side;

wherein the anonymous card or the plurality of anonymous cards being or is/are created independently of an application for a card by a holder, and the receiving of holder data and the personalizing of the personalized card or the creating of the personalized personalization data record is performed only in response to a request of a holder as soon as a holder applies for a card at the issuer system.

2. The method according to claim 1, wherein a plurality of anonymous account data records and a plurality of anonymous cards are created or received for a plurality of accounts, and for each anonymous card individual holder data are received.

3. The method according to claim 1, wherein as a card issuer a bank is provided, the supplying of the account data for the anonymous cards is effected at a bank system of the bank, and the receiving of holder data is effected in a bank branch of the bank.

4. The method according to claim 1, further comprising: supplying a card blank which comprises at least a card body.

5. The method according to claim 4, wherein the card blank comprises at least said card body and a chip, and on the basis of which the anonymous card is created.

6. A method for creating a personalized personalization data record for the personalization of a card in order to manufacture a personalized card, in an instant issuance system for a holder of the card, the method comprising steps performed at a manufacturer system of a card manufacturer, including:
1) receiving, from an issuer system of a card issuer, an anonymous account data record which comprises at least account data of an account at the issuer system, wherein the account data comprise at least an account number, wherein the account is not yet assigned to a holder of an account, and wherein the anonymous account data record either (i) comprises no name of a holder, or (ii) contains an anonymous or fictitious name instead of a name of a holder;
2.1) creating an anonymous personalization data record using the anonymous account data record, wherein the anonymous personalization data record comprises at least back side printing data for printing the back side of the card;
2.2) creating an anonymous card on the basis of the anonymous personalization data record, wherein for creating the anonymous card at least the back side of the card is printed according to the back side print data;
3) supplying the anonymous personalization data record in the manufacturer system;
4) transferring the anonymous card to the issuer system;
5) receiving, from the issuer system, holder data of a holder which comprise at least a name of the holder;
6.1) generating a personalized personalization data record based on the anonymous personalization data record and the holder data, wherein the personalized personalization data record comprises at least name print data for printing the card with the name of the holder and comprises no further back side print data for printing the back side of the card than those which are already contained in the anonymous personalization data record;
6.2) transferring the personalized personalization data record to the issuer system;
wherein a communication network is provided between the manufacturer system and the issuer system;
as a card there is provided a payment card;
the account data comprise a card verification value CVV;
the back side print data comprise CVV print data to print the back side of the card with the card verification value CVV; and
the anonymous card created according to step 2.2) is printed in step 2.2) with the card verification value CVV on the back side;
wherein the anonymous card or the plurality of anonymous cards being or is/are created independently of an application for a card by a holder, and
the receiving of holder data and personalizing of the personalized card or the creating of the personalized personalization data record is performed only in response to a request of a holder as soon as a holder applies for a card at the issuer system.

\* \* \* \* \*